Sept. 25, 1951  H. GEIGER ET AL  2,569,096
SAFETY RELEASE CAM
Filed Jan. 21, 1950
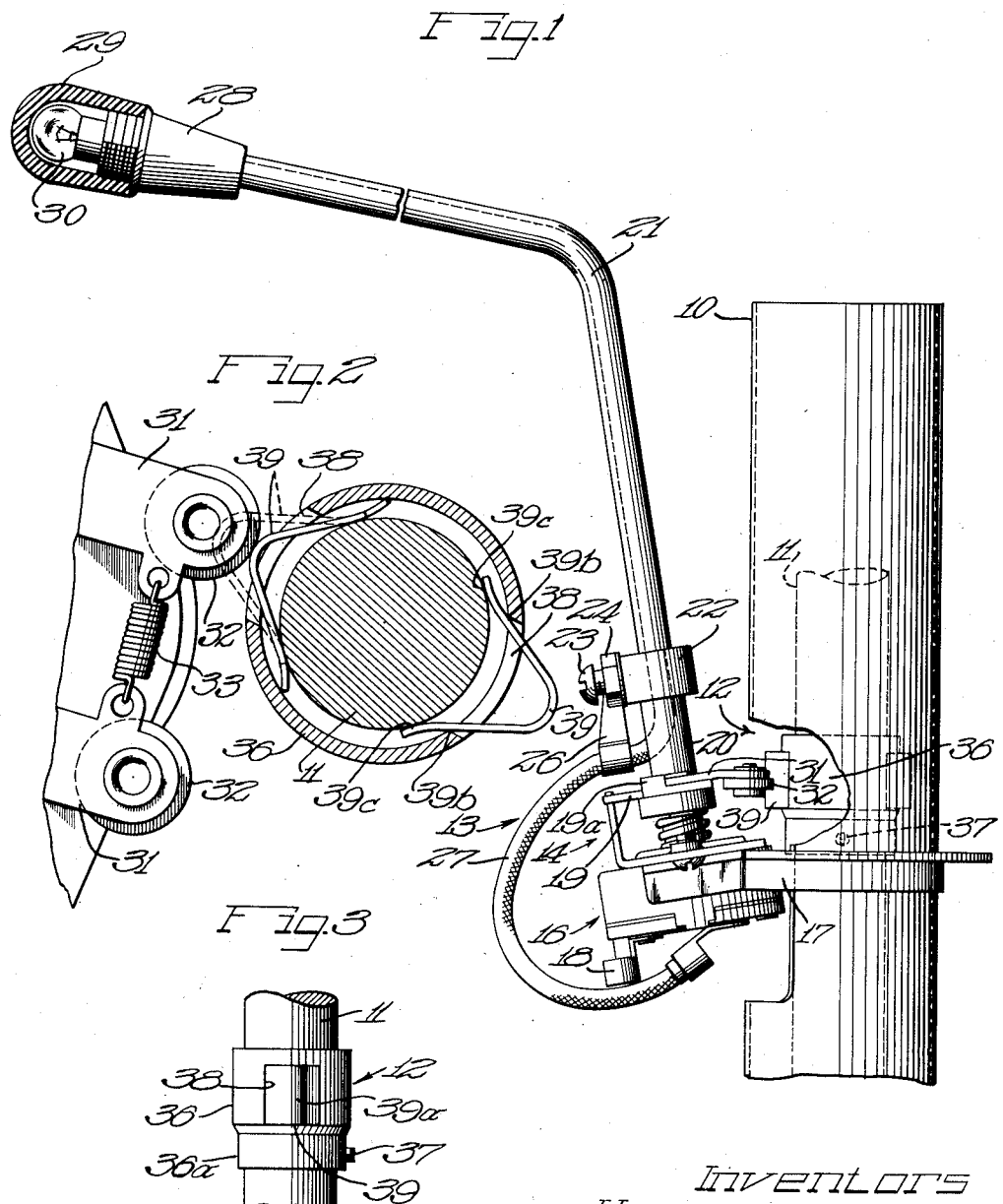
Inventors
Hermann Geiger
Nelson H. Weber
By [signature] Attys Patented Sept. 25, 1951

2,569,096

UNITED STATES PATENT OFFICE 2,569,096

SAFETY RELEASE CAM

Hermann Geiger and Nelson H. Weber, Bronson, Mich., assignors to Kingston Products Corporation, Kokomo, Ind., a corporation of Indiana Application January 21, 1950, Serial No. 139,952

5 Claims. (Cl. 74—567)

This invention relates generally to a directional turn-indicating mechanism for a vehicle, and more particularly relates to an improved safety release cam adapted to be associated with a steering post of a vehicle equipped with a directional turn-indicator device.

In the operation of directional turn-indicator devices, the operator of the vehicle will sometimes move the actuating lever to a given turn-indicating position some time in advance of the actual arrival of the vehicle at the turning point, for example, a road intersection. Not too infrequently, under such circumstances, it is necessary to maneuver the vehicle by adjusting the steering course of the vehicle. However, by so doing, it is quite possible that manipulation of the steering wheel will cause sufficient rotation of the steering post as to actuate the knock-off mechanism of the turn-indicating device, thereby restoring the device to a neutral position and extinguishing the signal lamp associated therewith.

As a practical matter, operators frequently anticipate such inadvertent release of the directional turn-indicating device, and in order to preclude such release along the line of approach to a turning point, the operator will hold the lever in a turn-indicating position while the steering wheel is turned in an opposite direction.

The inevitable result of such a series of events is the breaking or damaging of the switch mechanism which is caused through the displacement of the switch knock-off mechanism by a solid cam or striker device affixed to the steering post of the steering wheel assembly.

According to the features of the present invention, a safety release cam device is provided which may be connected to the steering post of a steering wheel assembly of a vehicle and which is cooperable with the vehicular directional signal switch mechanism. The safety release cam device includes a collar to surround the steering post which defines one or more apertures through which extends a generally V-shaped strip type cam spring. The apical portions of the cam spring extend through the apertures and the ends of the leg portions bear against spaced points on the steering post. The leg portions of the cam spring bear against the edges of the aperture. Thus, the cam spring will normally actuate the directional signal switch mechanism upon rotation of the steering post in a predetermined direction. However, the cam spring will yield radially inwardly under the influence of abnormal displacement forces, thereby precluding damage to the switch structure.

It is an object of this invention, therefore, to provide a safety release cam for connection to a steering post and cooperable with a vehicular directional signal switch assembly which will yield radially inwardly under the influence of abnormal displacement forces.

It is a further object of the present invention to provide a directional signal switch assembly which may be manually retained in a turn-indicating position without incurring the risks of breakage or damage through manipulation of the steering wheel in an opposite direction.

A further object of the present invention is to provide an improved knock-off device for a steering post of a vehicle which is economical to manufacture, adaptable for use in various installations, and efficient in operation.

Many other features, advantages and additional objects of the present invention will become apparent to those versed in the art upon making reference to the detailed description which follows and the accompanying sheet of drawings, in which:

Figure 1 is a side elevational view with parts broken away and with parts shown in cross-section of a directional signal switch mechanism attached to the steering post of a vehicle and embodying the principles of the present invention;

Figure 2 is a fragmentary enlarged cross-sectional view showing additional details of construction and illustrating the operation of the safety release cam of the present invention; and Figure 3 is a fragmentary elevational view of the safety release cam of the present invention as applied to the steering post of a vehicle.

As shown on the drawing:

A steering column is indicated by the reference numeral 10 through which extends a rotatable steering post 11. The safety release cam of the present invention is indicated generally by the reference numeral 12 and a directional signal switch assembly with which the safety release cam 12 is associated is indicated generally by the reference numeral 13.

The directional signal switch mechanism 13 comprises a resetting mechanism indicated by the reference numeral 14 and a switch mechanism indicated by the reference numeral 16.

The electric switch unit 16 is mounted to the steering column 10 by means of a frame support 17. The usual terminals 18 may be situated on the underside of the electric switch unit 16.

The resetting mechanism 14 includes a plate 19 firmly affixed to an upstanding slotted stem 20 which receives a tubular operating lever 21 therein. The tubular operating lever 21 may be locked in the stem 20 by means of a collar 22 which carries a set screw 23 and a lock nut 24. A support clip 26 may also be carried by the collar 22 to position a conductor wire 27 away from the resetting mechanism 14, such conductor wire 27 passing through the hollow tubular stem of the operating lever 21.

The free end of the operating lever 21 is characterized by a threaded boss 28 which receives a plastic translucent cover 29 in threaded assembly thereon, the cover 29 being shaped to form a handle portion for the operating lever 21 as well as to enclose a lamp bulb 30 situated on the end of the operating lever 21.

A pair of detents 31 are respectively pivotally mounted adjacent opposite edges of the plate 19. Each detent 31 has a roller 32 journaled on its outer end and a common spring 33 operates between the two detents 31 to normally maintain them in abutting engagement with upstanding integral ears 19a formed on the arm or plate 19.

As shown on the drawing, the safety release cam 12, which is sometimes referred to in the trade as a knock-off device or a striker device, includes a collar 36 to surround the steering post 11, the collar 36 having a reduced neck portion 36a for snugly engaging the steering post 11. The collar 36 may be provided with a threaded aperture to receive a set screw 37 so as to lock the collar 36 in any adjusted position along the length of the steering post 11.

The collar 36 is provided with a plurality of apertures 38 which are radially spaced from one another.

A generally V-shaped strip of resilient spring metal forming a spring cam 39 is provided and is retained by the collar 36. As shown in this particular embodiment, the collar 36 retains a pair of spring cams 39.

Each of the cam springs 39 is provided with a vertex portion or apical portion 39a which projects radially outwardly of the steering post 11 through the apertures 38 of the collar 36. The respective arm portions of the cam springs 39 abut against the edges of the apertures 38 in the collar 36 as at 39b (Figure 2). The ends of the leg portions of the cam springs 39 abut the steering post 11 at spaced points as at 39c.

Under normal operating conditions, the operating lever 21 of the directional signal switch mechanism indicated generally by the reference numeral 13 may be actuated to move the detents 31 into proximity with the steering post 11 whenever the directional signal switch mechanism is moved to a turn-indicating position. Thus, under normal conditions, the cam springs 39 will operate to actuate one of the detents 31 by engaging one of the rollers 32 as shown in Figure 1.

If an abnormal operation condition arises, for example, if the operating lever 21 is held in turn-indicating position by the operator and the steering wheel (not shown) is turned in an opposite direction so as to rotate the steering post 11 in the wrong direction with respect to the resetting mechanism 14, the cam springs 39 will be moved from the radially extending position shown in dotted lines in Figure 2 and will yield radially inwardly to the full line position shown in Figure 2 to permit passage of the cam springs 39 past the roller 32 of the detent 31. By yielding radially inwardly under the influence of such an abnormal displacement force, damage or breakage to the switch mechanism is precluded.

It will be apparent to those versed in the art that certain minor modifications may be made to the structure herein described and shown by way of preferred embodiment without departing from the principles of this invention. Accordingly, it should be understood that we do not wish to be limited to the precise details described, but wish to embody within the scope of this patent all such modifications as reasonably and properly come within the scope of our contribution to the art.

We claim as our invention:

1. In a directional signal switch assembly cooperable with the steering assembly of a vehicle, a rotatable steering post, a resetting mechanism having cam elements selectively movable into and out of a locale proximate the steering post, a pair of generally V-shaped strips of resilient spring metal arranged on diametrically opposite sides of the steering post, a collar surrounding the steering post in the locale of the resetting mechanism and defining a pair of spaced apertures constructed to receive the apicillary portions of the strips in outwardly projecting relationship, the leg portions of the strips bearing at spaced points against the steering post, and means to lock the collar to the steering post, whereby the strips will normally actuate the cam elements of the resetting mechanism but will yield radially inwardly under the influence of abnormal displacement forces.

2. In a knock-off device for the steering post of a vehicle adapted for cooperation with a directional signal switch mechanism comprising a collar to surround the steering post, said collar defining at least one aperture therein, a bent strip-type cam spring, said cam spring having a vertical portion thereof extending through the aperture with leg portions extending inwardly, the leg portions of the cam spring bearing against the edges of the aperture and the ends of the leg portions of the cam spring bearing against spaced points of the steering post, whereby the cam spring will normally actuate the directional signal switch mechanism but will yield radially inwardly under the influence of abnormal displacement forces.

3. In a knock-off device for the steering post of a vehicle adapted for cooperation with the directional signal switch mechanism comprising a collar to surround the steering post, said collar defining at least one aperture therein, a strip-type cam spring bent back upon itself, said cam spring having an apical portion thereof extending through the aperture, the leg portions of the cam spring bearing against the edges of the aperture and the ends of the leg portions of the cam spring bearing against spaced points of the steering post, whereby the cam spring will normally actuate the directional signal switch mechanism but will yield radially inwardly under the influence of abnormal displacement forces, and means to lock the collar to the steering post.

4. A striker device attachable to a vehicular steering post and cooperable with a directional signal switch mechanism comprising a collar to surround the steering post and having an aperture therein, means to lock the collar at adjusted positions along the length of the post whereby the striker device may be aligned proximate a switch mechanism, and a cam spring carried by the collar, said cam spring being made of resilient material and defining at least one protuberance extending radially outwardly through said aperture of the collar, said protuberance of said cam spring operable normally to actuate the switch mechanism but being yieldable radially inwardly against the resilience of said cam spring under abnormal displacement forces.

5. A safety release cam for a vehicular directional switch assembly comprising, a V-shaped spring member having an apical portion and oppositely aligned legs extending away therefrom, and support means constructed and arranged to carry said spring member in co-rotatable assembly with a vehicular steering post, said support means abutting said legs and limiting outward movement of said spring member with said apical portion of said spring member projecting radially outwardly of said support means and forming a switch actuating cam, said cam operable normally to actuate a switching device arranged in registry therewith but yielding radially inwardly under abnormal displacement forces, said legs being displaceable relative to said support means to accommodate the radially inward movement of said apical portion of said spring member.

HERMANN GEIGER.
NELSON H. WEBER.

REFERENCES CITED

The following references are of record in the file of this patent:

UNITED STATES PATENTS

| Number | Name | Date |
|---|---|---|
| 245,030 | Thompson | Aug. 2, 1881 |
| 1,780,856 | Adam | Nov. 4, 1930 |
| 2,288,435 | Browne | June 30, 1942 |